United States Patent

Paul et al.

[15] 3,683,407

[45] Aug. 8, 1972

[54] HIGH DENSITY MAGNETIC RECORDING SCHEME

[72] Inventors: Maynard C. Paul; Gerald F. Sauter; Paul E. Oberg, all of Minneapolis, Minn.

[73] Assignee: Sperry Rand Corporation, New York, N.Y.

[22] Filed: May 21, 1970

[21] Appl. No.: 39,194

[52] U.S. Cl....346/74 M, 340/174.1 G, 340/174.1 F, 346/74 MC

[51] Int. Cl. ............................G11b 5/16, G11b 5/02

[58] Field of Search...346/74 M, 74 MC, 179/100.2 C, 340/174.1 F, 174.1 G

[56] References Cited

UNITED STATES PATENTS 3,564,588 2/1971 Tolman et al.........346/74 MC

*Primary Examiner*—Bernard Konick
*Assistant Examiner*—Gary M. Hoffman
*Attorney*—Kenneth T. Grace, Thomas J. Nikolai and John P. Dority

[57] ABSTRACT

A method of high density magnetic recording with a single bipolar signal field using a magnetic recording head having a recording gap that is inductively coupled to a relatively moving thin-ferromagnetic-film recording medium of a thickness that is insufficient to support Bloch walls, i.e., can only support Neel walls, between adjacent domains and having an easy axis that is orthogonal to the direction of relative movement of, or parallel to, the recording gap length. The recording medium's interdomain Neel walls are formed with the magnetization within the interdomain walls all having the same directional rotational, i.e., winding, sense, e.g., clockwise or counterclockwise, by utilizing a magnetic recording head that has its recording gap parallel to the recording medium's easy axis, and that has a drive line that provides a bipolar signal field that is oriented at an acute angle to the recording gap so that the gap field and an orthogonal component of the driveline provided signal filed are applied orthogonally and parallel, respectively, to the easy axis direction of the recording medium.

5 Claims, 5 Drawing Figures

INVENTORS
PAUL E. OBERG
MAYNARD C. PAUL
GERALD F. SAUTER

BY Kenneth T. Grace
ATTORNEY

HIGH DENSITY MAGNETIC RECORDING SCHEME

BACKGROUND OF THE INVENTION

The invention herein described was made in the course of or under a contract or subcontract thereunder, with the Department of the Navy.

The present invention is considered to be an improvement to the high density magnetic recording scheme of the patent application of C. H. Tolman, et al., Ser. No. 755,186, filed Aug. 26, 1968 now U.S. Pat. No. 3,564,558. In that invention there is provided a scheme for achieving high density magnetic recording using a magnetic recording head having a recording gap that is inductively coupled to a relatively moving thin-ferromagnetic-film recording medium. The recording medium is of a thickness insufficient to support Bloch wall, i.e., can only support Néel walls, between adjacent domains and has an easy axis that is orthogonal to the direction of relative movement, i.e., transverse recording. The recording medium's interdomain walls are formed with the magnetization within the walls having the same directional rotational, i.e., winding, sense, e.g., clockwise or counterclockwise, by applying orthogonal fields $H_L$ and $H_T$ in the recording gap. The $H_L$ field polarity, i.e., along the recording medium's easy axis, is of a first or a second and opposite polarity while the $H_T$ polarity, i.e., transverse to the recording medium's easy axis, is of a corresponding first or a second and opposite polarity for causing the resulting field $H_R$ to rotate in the same winding sense during the generation of the interdomain walls. By utilizing Néel interdomain walls in the same winding sense, the walls are substantially nonannihilating permitting high density magnetic recording with magnetizable materials having small field switching properties and are precisely positioned in the recording medium by the leading edge of the trailing pole piece as determined by the timing of the polarity reversal of the concurrently applied $H_L$ and $H_T$ field generating current signals.

SUMMARY OF THE INVENTION

The present invention is directed toward a magnetic recording scheme for achieving high density magnetic recording using a magnetic recording head having a gap that is inductively coupled to the relatively moving thin-ferromagnetic-film recording medium. As in the above referenced C. H. Tolman, et al., application, the recording medium utilized by the present invention is of a thickness insufficient to support Bloch walls, i.e., can only support Néel walls, between adjacent domains and has an easy axis that is orthogonal to the direction of relative movement, i.e., transverse recording. The recording medium's interdomain walls are formed with the magnetization within the interdomain walls all having the same directional rotational, i.e., winding, sense, e.g., clockwise or counterclockwise, by the use of a single bipolar signal field.

The recording head is comprised of a mated, thin-ferromagnetic-film, magnetizable layer, structure and a conductive member. The recording gap is formed in the magnetizable layer at an acute angle $\theta$ with the long axis of the conductive member while the magnetizable layer has established therein an easy axis that is skewed with respect to the long axis of the conductive member. The recording gap is oriented parallel to the recording medium's easy axis and has an inductive relationship thereto such that upon application of a signal field $H_S$ from the conductive member, the resulting gap field $H_G$ is a recording medium hard axis drive field capable of aligning the magnetization $M_M$ of the recording medium along the recording medium's hard axis. The application of the current signal to the sandwiched conductive member generates a signal field $H_S$ that is at an acute angle $\phi = 90 - \theta$ to the recording gap that is much smaller in intensity, i.e., $H_G >> H_S$, than the gap field $H_G$. The signal field $H_S$ also generates a vector component bias field $H_B$ orthogonal to the gap field $H_G$ and parallel to the recording gap. This bias field $H_B$ in combination with the gap field $H_G$ provides a resultant field $H_R$ of sufficient intensity in the recording gap to steer the magnetization of the recording medium $M_M$ toward the one stable magnetization state or the other out of the otherwise hard axis alignment that would be caused by the unbiased gap field $H_G$. Upon passage of the recording gap and its field along the recording medium the recording medium's magnetization $M_M$ follows the field into alignment with its easy axis and the polarity is determined by the associated polarity of the applied signal field $H_S$.

Upon reversal of the polarity of the signal field $H_S$, e.g., for the writing of consecutive "0," "1," "0," etc., the signal field intensity, when it falls below the $H_K$ of the magnetizable layer of the recording head, causes the magnetization $M_M$ of the recording medium to rotate, e.g., counterclockwise, from a hard axis position through the so-formed interdomain wall in the direction of the magnetizable layer's easy axis and upon reversal of the signal field $H_S$ polarity to again rotate counterclockwise toward its new hard axis alignment. Upon passage of the recording gap along the recording medium, the recording medium's magnetization $M_M$ falls into alignment with its easy axis in a new polarity that is determined by the associated new polarity of the applied signal field $H_S$.

DESCRIPTION OF THE PREFERRED EMBODIMENT

Figure 1:
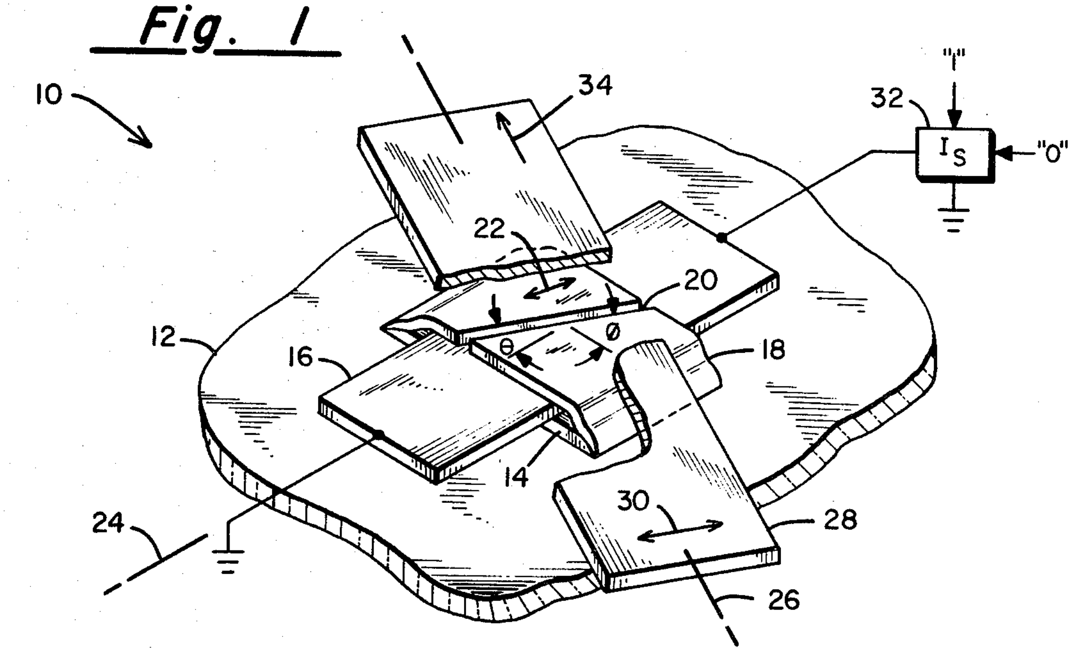
FIG. 1 is a perspective view of a magnetic recording head arrangement that may be utilized by the present invention.

With particular reference to FIG. 1, there is presented a perspective view of a magnetic recording head arrangement that may be utilized by the present invention. Recording head 10 essentially consists of a stacked, superposed arrangement of substrate member 12, magnetizable layer 14, conductive layer 16, magnetizable layer 18, such layers preferably being formed in a continuous vapor deposition process. As an illustrative example, conductive layer 16 may be a copper strip 40,000 angstroms (A) thick and 0.01 inch wide while magnetizable layers 14, 18 may be thin-ferromagnetic-film layers 81% Ni—19% Fe 4,000 A thick and 0.015 inch wide, both layers having an easy axis 22 aligned as shown, skewed as shown from a direction parallel to the longitudinal axis 24 of conductive layer 16 sufficient to overcome any accidental dispersion or skew in the magnetization of the head, so that all the magnetization will rotate one way, and as shown upon application of the field from conductive layer 16 to the magnetizable layers 14 and 18. When skewed as shown, the stray field generated by the rotating magnetization in the head will add to the steering field of layer 16 and in addition will maintain a steering field while the current in layer 16 and its associated field passes through zero. Recording gap 20 may be in the order of 0.0001 inch wide oriented at an angle $\theta = 30°$ with the longitudinal axis 24 of conductive layer 16. Superposed the recording head 10 with its longitudinal axis 26 oriented orthogonal to recording gap 20 is a magnetizable recording medium 28 moving in a direction of arrow 34 and having as a recording medium a thin-ferromagnetic-film layer of a thickness that is insufficient to support Bloch walls, i.e., can only support Nèel walls, between adjacent domains and that has an easy axis 30 that is parallel to recording gap 20. Signal source 32, as will be described in detail hereinafter, couples the appropriate polarity current signal $I_S$ to conductive layer 16 for causing the recording of the respectively associated "1 " or "0" in recording medium 28 as a first or a second and opposite polarization of the recording medium's magnetization $M_M$ along its easy axis 30.

Figure 2:
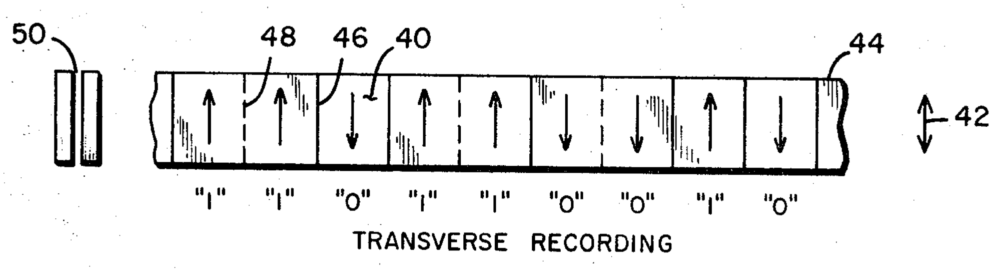
FIG. 2 is an illustration of the domain magnetization directions for the transverse recording system of the present invention.

With particular reference to FIG. 2 there is presented an illustration of the domain magnetization directions for the transverse recording system of the present invention. In the transverse recording system, the domains 40 have their magnetization directions oriented in a first or a second and opposite direction along easy axis 42 of magnetizable medium 44. Interdomain walls 46, between domains of opposite magnetization direction, are, consequently, oriented substantially parallel to the easy axis 42 establishing walls of inherently relatively high stability. Interdomain wall 48 between domains of like magnetization polarization does not exist, with contiguous domains of like magnetization polarization constituting one large domain. The recording gap 50 is oriented parallel to the easy axis 42 of magnetizable medium 44 whereby the overall system arrangement permits the recording gap 50 trailing edge to establish sharply defined interdomain walls 46 of high stability.

Figure 3:
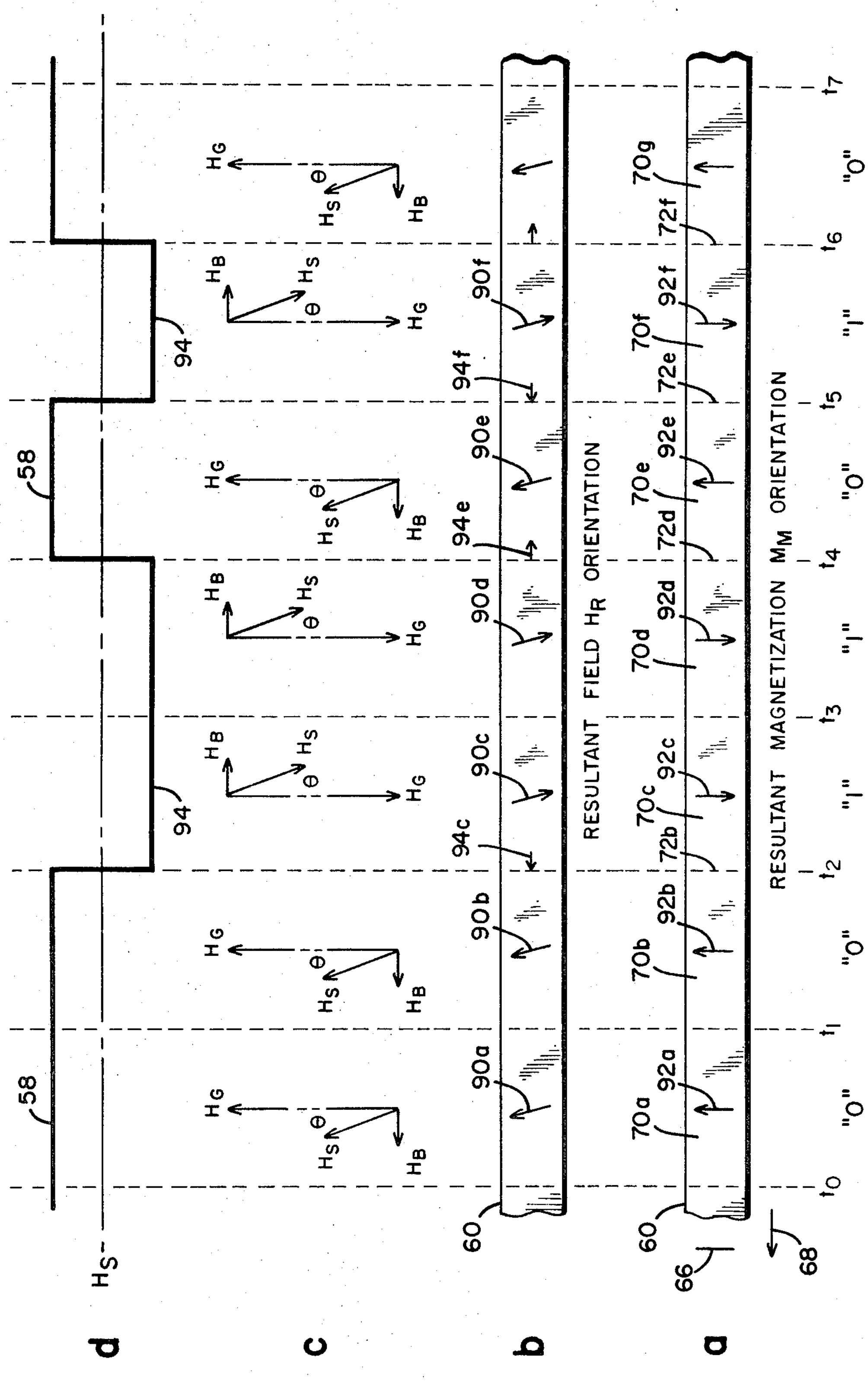
FIG. 3 are illustrations of the signal field $H_S$; vector diagrams of the recording gap field $H_G$, the signal field $H_S$ and the bias field $H_B$; the resultant field $H_R$; and the resulting magnetization orientation in the recording medium.

With particular reference to FIG. 3 there are presented: the waveform of the signal field $H_S$ produced by conductive layer 16 when the appropriate polarity current signals $I_S$ are coupled thereto by signal source 32 (FIG. 3*d*); vector diagrams of the recording gap field $H_G$, the signal field $H_S$ and the bias field $H_B$ (FIG. 3*c*); the resultant field $H_R$ orientation in the recording gap 20 due to the signal field $H_S$ (FIG. 3*b*); and, the resulting magnetization $M_M$ orientation in the recording medium 60 after passage of the recording gap 20 trailing edge. The single bipolar signal field $H_S$ produces the recording gap field $H_G$ through interaction with the magnetizable head layers, and the bias field $H_B$, which is the orthogonal component of the signal field $H_S$ along recording gap 20 length, to generate a resultant field $H_R$ in the recording gap 20 that rotates in the same winding sense during the generation of the interdomain walls in the recording medium 60. The resultant field $H_R$, in turn, causes the resultant magnetization $M_M$ orientation to be established in the recording medium 60 for the writing of the digital information therein.

Figure 4:
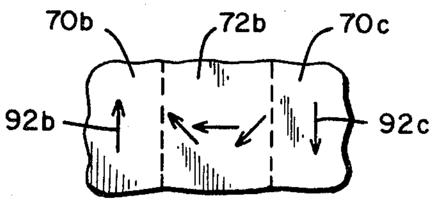
FIG. 4 is a detail illustration of the counterclockwise rotating vectors in an interdomain Néel wall between contiguous "0," "1" domains.
Figure 5:
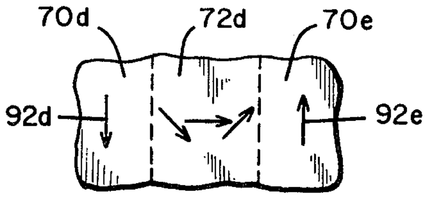
FIG. 5 is a detail illustration of the counterclockwise rotating vectors in an interdomain Néel wall between contiguous "1," "0" domains.

FIG. 3*a* depicts magnetizable medium 60 as having an easy axis 66 and moving in the direction of arrow 68. Recording medium 60 may be considered to be of one track width having a plurality of domains 70 wherein the domains 70 of opposite magnetization polarization are separated by an interdomain Nèel wall 72. As stated hereinabove, an essential element of the present invention involves establishing the magnetization within the interdomain Nèel walls into the same winding sense. The convention illustrated is that of a uniform counterclockwise winding sense of the magnetization within the interdomain Nèel walls to establish the magnetization within the interdomain Nèel walls to establish the magnetization direction in contiguous domains of opposite polarization along the easy axis 66. FIGS. 4 and 5 are presented to more fully detail the counterclockwise rotating vectors in interdomain walls 72*b*, 72*d*, respectively, illustrating the transition from consecutive recording of "0," "1" and "1," "0 " respectively.

With reference back to FIG. 3 the operation of the recording scheme of the present invention will now be explained. With current source 32 coupling the appropriate polarity current signal $I_S$ to conductive layer 16 there is generated about conductive layer 16 and particularly in the area of magnetizable layers 14, 18 the signal field $H_S$ of the noted polarities. Signal field $H_S$ (FIG. 3*d*) is, in the area of magnetizable layers 14, 18 a circumferential field at an acute angle $\phi = 90 - \theta$ to recording gap 20 and easy axis 30 of recording medium 28. As magnetizable layers 14, 18 are thin-ferromagnetic-film layers of high flux retentivity they provide across recording gap 20 a gap field $H_G$ of an intensity that is many orders of magnitude greater than that of the signal field $H_S$ and which is oriented across recording gap 20 at an angle $\theta$ with respect to signal field $H_S$. This vector relationship is plotted in FIG. 3*c*. The signal field $H_S$ generates a bias field $H_B$ which is the component of the signal field $H_S$ that is orthogonal to the gap field $H_G$ in recording gap 20. This bias field $H_B$ in a first or a second and opposite direction, according to the associated polarity of the applied signal field $H_S$, generating the resultant field $H_R$ orientation of FIG. 3*b*. Upon passage of the recording gap 20 along the recording medium 60 the recording meadium's magnetization $M_M$ falls into alignment with its easy axis 66 in the polarity that is determined by the associated polarity of the applied signal field $H_S$.

When that portion of recording medium 60 that was in the recording gap 20 of recording head 10 that was affected by the resultant field $H_R$ of vector 90*a* passes out from under such recording gap the resultant magnetization $M_M$ orientation aligns itself in an upward direction with respect to easy axis 66 as illustrated by vector 92a of FIG. 3a. This, for purposes of discussion, may be assumed to be the writing of a "0." If a like signal, e.g., "0," is to be written into the next contiguous domain 70b as at time $t_1$, current source 32 merely continues coupling its positive current signal polarity to conductive layer 16 whereby the magnetization $M_M$ of domain 70b is caused to be aligned in an upward direction along its easy axis 66 as illustrated by vector 90b in a manner similar to that discussed with particular reference to magnetization $M_M$ vector 92a and time $t_0$.

If it is desired to write different digital data, e.g., a "1," in a next contiguous domain 70c, pulse source 32 as at time $t_2$ is caused to couple the negative current signal polarity to conductive layer 16 for generating the signal field $H_S$ of a negative polarity amplitude 94 which is of the same magnitude but of opposite polarity as amplitude 58. As the signal field $H_S$ decreases through zero intensity, the gap field $H_G$, due to the magnetization of layers 14, 18, is affected in a manner whereupon the resultant field $H_R$ is caused to rotate in a counterclockwise direction through the leftward direction vector 94c. As the signal field $H_S$ increases in intensity in the negative polarity gap field $H_G$ is again affected in a manner whereupon the resultant field $H_R$ is caused to continue rotating in the counterclockwise direction assuming the downward direction vector 90c. When that portion of recording medium 60 that was in the recording gap 20 of recording head 10 and that was affected by the resultant field $H_R$ of vector 90c passes out from under such recording gap the resultant magnetization $M_M$ orientation aligns itself in a downward direction with easy axis 66 as illustrated by vector 92c of FIG. 3a. This, for purposes of discussion, may be assumed to be the writing of a "1." If a like signal, e.g., "1," is to be written into the next contiguous domain 70d as at time $t_3$, current source 32 merely continues coupling the appropriate current signal to conductive member 16 generating the negative polarity signal field $H_S$ of an amplitude 94 whereby the magnetization $M_M$ of domain 70d is caused to be aligned in a downward direction along its easy axis 66 as illustrated by vector 92d.

If it is desired to write different digital data, e.g., a "0," is a next contiguous domain 70e, pulse source 32 as at time $t_4$ is caused to couple the positive current signal polarity to conductive layer 16 for generating the signal field $H_S$ of a positive polarity amplitude 58. As the signal field $H_S$ decreases in intensity below the anisotropy field $H_K$ of the magnetizable layers 14, 18 of recording head 10 and passes through a zero intensity, the gap field $H_G$, due to the magnetization of layers 14, 18, is affected in a corresponding manner whereupon the resultant field $H_R$ is caused to rotate in a counterclockwise direction through the rightward direction vector 94e. As the signal field $H_S$ increases in intensity in the positive polarity above the anisotropy field $H_K$ of the magnetizable layers 14, 18 the gap field $H_G$ is again affected in a corresponding manner whereupon the resultant field $H_R$ is caused to continue rotating in the counterclockwise direction assuming the upward direction vector 90e. When that portion of recording medium 60 that was in the recording gap 20 of recording head 10 and that was affected by the resultant field $H_R$ of vector 90e passes out from under such recording gap the resultant magnetization $M_M$ orientation aligns itself in an upward direction with easy axis 66 as illustrated by vector 92e of FIG. 3a. This, for purposes of discussion, may be assumed to be the writing of a "0."

What is claimed is:

1. A method of high density magnetic recording by a single bipolar signal field $H_S$ using a magnetic recording head that includes a single drive conductor surrounded by a substantially closed flux path layer of magnetizable material having a recording gap therein that is oriented at an angle $\phi$ to the bipolar signal field $H_S$ which recording gap is inductively coupled to a relatively moving magnetizable recording medium that is of a thickness insufficient to support Bloch walls between adjacent domains and which recording medium has an easy axis that is parallel to the recording gap and that moves in a direction orthogonal thereto, the method comprising:
   - generating a bipolar signal field $H_S$ by a current signal $I_S$ flowing through said drive conductor;
   - aligning the magnetization of said magnetizable layer by and with said signal field $H_S$;
   - generating a bipolar gap field $H_G$ across said recording gap and in the recording medium by the magnetization of said magnetizable layer and the component of said signal field $H_S$ across said recording gap, which gap field is substantially orthogonal to said recording gap and is at an acute angle $\theta = 90° - \phi$ with respect to said signal field $H_S$;
   - generating a bipolar bias field $H_B$ along said recording gap and in the recording medium which bias field is the component of said signal field $H_S$ that is oriented substantially orthogonal to said gap field $H_G$;
   - generating a resultant field $H_R$ in said recording gap and in said recording medium which resultant field $H_R$ is the resultant of said orthogonal bias field $H_B$ and said gap field $H_G$;
   - rotating said resultant field $H_R$ in the same continuing direction upon the successive changes of polarity of said signal field $H_S$ for establishing in said recording medium interdomain Néel walls that are parallel to the recording medium's easy axis and that rotate in the same magnetic sense in the plane of the recording medium.

2. The method of claim 1 in which said bipolar signal field $H_S$ is of a sufficient intensity in the area of said layer of magnetizable material to align the magnetization thereof orthogonal to said longitudinal axis and at said angle $\phi$ with said recording gap.

3. A high density magnetic recording system, comprising: a magnetic recording head comprising:
   - a drive conductor having a longitudinal axis;
   - a substantially closed flux path layer of magnetizable material about said drive conductor having a recording gap therein that is oriented at an acute angle $\theta$ with said longitudinal axis and having an easy axis that is sufficiently angularly skewed with respect to said longitudinal axis to overcome any angular dispersion of the magnetization of said layer;

a relatively moving magnetizable recording medium inductively coupled to said recording gap which recording medium is of a thickness insufficient to support Bloch walls between adjacent domains and which recording medium has an easy axis that is oriented parallel to and that is moved in a direction that is orthogonal to said recording gap;

signal means coupled to said drive conductor and generating a bipolar signal field in the area of said recording gap for establishing in said recording medium interdomain Néel walls that are parallel to the recording medium's easy axis and that rotate in the same magnetic sense in the plane of the recording medium upon each change of polarity of said signal field.

4. The recording system of claim 3 in which said drive conductor is a substantially planar member and said magnetizable layer is formed of two substantially planar members of ferromagnetic material having opposing edges that overlap said drive conductor for forming said substantially closed flux path.

5. The recording system of claim 4 in which said recording gap is formed in a top one of said two substantially planar members of ferromagnetic material with said acute angle $\theta$ being greater than said easy axis skew angle.

* * * * *